(12) United States Patent
Wilson et al.

(10) Patent No.: US 9,881,159 B1
(45) Date of Patent: Jan. 30, 2018

(54) WORKLOAD EXECUTION SYSTEMS AND METHODS

(71) Applicant: Dell Software Inc., Aliso Viejo, CA (US)

(72) Inventors: Jacqueline H. Wilson, Austin, TX (US); Sajawal Haider, Greenlawn, NY (US); James C. Lowery, Austin, TX (US); David Mortman, Worthington, OH (US)

(73) Assignee: Quest Software Inc., Aliso Viejo, CA (US)

( * ) Notice: Subject to any disclaimer, the term of this patent is extended or adjusted under 35 U.S.C. 154(b) by 0 days.

(21) Appl. No.: 14/541,791

(22) Filed: Nov. 14, 2014

(51) Int. Cl.
*G06F 21/57* (2013.01)
*H04L 29/06* (2006.01)
*G06F 21/64* (2013.01)
*G06F 21/62* (2013.01)
*G06F 9/455* (2006.01)

(52) U.S. Cl.
CPC ............ *G06F 21/57* (2013.01); *G06F 21/629* (2013.01); *G06F 21/64* (2013.01); *H04L 63/0823* (2013.01); *H04L 63/126* (2013.01); *H04L 63/20* (2013.01); *G06F 2009/45587* (2013.01)

(58) Field of Classification Search
CPC .......... G06F 21/50; G06F 21/51; G06F 21/57; G06F 21/62; G06F 21/629; G06F 21/64; G06F 9/455; G06F 9/45533; G06F 9/45558; G06F 2009/45587; H04L 63/20; H04L 63/126; H04L 63/12
See application file for complete search history.

(56) References Cited

U.S. PATENT DOCUMENTS 6,697,824 B1 * 2/2004 Bowman-Amuah ... G06F 17/3089
707/E17.116
8,336,079 B2 12/2012 Budko et al.
(Continued)

OTHER PUBLICATIONS

Wikipedia, "Intelligent Workload Management," http://en.wikipedia.org, Mar. 20, 2013, 3 pages.
(Continued)

*Primary Examiner* — Zachary A Davis
(74) *Attorney, Agent, or Firm* — Winstead PC (57) ABSTRACT

In one embodiment, a method is executed by a computer system. The method includes receiving information related to a platform-portable workload, the information comprising a data security policy expressed as digitally signed metadata. The data security policy specifies one or more data security features that any platform executing the platform-portable workload should implement. The method further includes validating the digitally signed metadata as originating from an issuer of the platform-portable workload. In addition, the method includes, responsive to successful validation of the digitally signed metadata, automatically determining whether a particular platform can satisfy the data security policy based, at least in part, on a comparison of the digitally signed metadata with data security attributes of the particular platform. Further, the method includes, responsive to a determination that the particular platform cannot satisfy the data security policy, automatically preventing execution of the platform-portable workload on the particular platform.

16 Claims, 3 Drawing Sheets

(56) References Cited

U.S. PATENT DOCUMENTS

| | | | |
|---|---|---|---|
| 8,843,412 B2* | 9/2014 | Paliwal | 705/50 |
| 9,253,209 B2* | 2/2016 | Muppidi | H04W 12/08 |
| 2006/0106836 A1* | 5/2006 | Masugi | G06F 21/33 |
| 2007/0240194 A1* | 10/2007 | Hargrave | G06F 21/6209 726/1 |
| 2011/0083131 A1 | 4/2011 | Pirzada et al. | |
| 2011/0126275 A1 | 5/2011 | Anderson et al. | |
| 2013/0205363 A1* | 8/2013 | Kiehtreiber | H04L 63/20 726/1 |

OTHER PUBLICATIONS

Distributed Management Task Force, Inc. (DMTF); "Open Virtualization Format Specification"; DMTF DSP0243, Version 1.1.0; Jan. 12, 2010; 42 pages.

\* cited by examiner

WORKLOAD EXECUTION SYSTEMS AND METHODS

BACKGROUND

Technical Field

The present disclosure relates generally to security and more particularly, but not by way of limitation, to workload execution systems and methods.

History of Related Art

Typically, platforms that execute workloads consider performance-related requirements of the workloads such as, for example, processor, memory, and storage requirements. However, workloads may also be subject to data security requirements imposed by law, customers, or other sources. In general, data security requirements are not applied and enforced in an adequate manner.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled; how the information is handled; how much information is processed, stored, or communicated; and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is executed by a computer system. The method includes receiving information related to a platform-portable workload, the information comprising a data security policy expressed as digitally signed metadata. The data security policy specifies one or more data security features that any platform executing the platform-portable workload should implement. The method further includes validating the digitally signed metadata as originating from an issuer of the platform-portable workload. In addition, the method includes, responsive to successful validation of the digitally signed metadata, automatically determining whether a particular platform can satisfy the data security policy based, at least in part, on a comparison of the digitally signed metadata with data security attributes of the particular platform. Further, the method includes, responsive to a determination that the particular platform cannot satisfy the data security policy, automatically preventing execution of the platform-portable workload on the particular platform.

In one embodiment, an information handling system includes a processing unit, wherein the processing unit is operable to implement a method. The method includes receiving information related to a platform-portable workload, the information comprising a data security policy expressed as digitally signed metadata. The data security policy specifies one or more data security features that any platform executing the platform-portable workload should implement. The method further includes validating the digitally signed metadata as originating from an issuer of the platform-portable workload. In addition, the method includes, responsive to successful validation of the digitally signed metadata, automatically determining whether a particular platform can satisfy the data security policy based, at least in part, on a comparison of the digitally signed metadata with data security attributes of the particular platform. Further, the method includes, responsive to a determination that the particular platform cannot satisfy the data security policy, automatically preventing execution of the platform-portable workload on the particular platform.

In one embodiment, a computer-program product includes a non-transitory computer-usable medium having computer-readable program code embodied therein. The computer-readable program code is adapted to be executed to implement a method. The method includes receiving information related to a platform-portable workload, the information comprising a data security policy expressed as digitally signed metadata. The data security policy specifies one or more data security features that any platform executing the platform-portable workload should implement. The method further includes validating the digitally signed metadata as originating from an issuer of the platform-portable workload. In addition, the method includes, responsive to successful validation of the digitally signed metadata, automatically determining whether a particular platform can satisfy the data security policy based, at least in part, on a comparison of the digitally signed metadata with data security attributes of the particular platform. Further, the method includes, responsive to a determination that the particular platform cannot satisfy the data security policy, automatically preventing execution of the platform-portable workload on the particular platform.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

A computing platform, often referred to herein simply as a platform, typically provides computing resources for executing platform-portable workloads. A given platform can include, among other things, one or more physical machines, one or more data centers, one or more private clouds, one or more public clouds, etc. In general, platform-portable workloads can be self-contained units devoted to performing one or more specific computing tasks. For example, a given platform-portable workload can be, or include, an integrated stack that further includes one or more applications, middleware, a database, and/or an operating system. In many cases, a platform-portable workload can be, or include, a virtual machine image or a virtual appliance representative of a pre-configured virtual machine image. It should be appreciated that, as used herein, a virtual machine is a generic concept that encompasses any runtime environment which accepts a workload payload of a pre-defined nature. The term virtual machine can include, for example, x86 virtual machines, containers that depend on operating system—level virtualization technologies such as LINUX Containers (LXC), and/or the like. In general, platform-portable workloads are platform agnostic, for example, by being executable on any one of a multiplicity of platforms.

In various embodiments, platform-portable workloads may be subject to specific security requirements. These security requirements can include, for example, a requirement that the workload be encrypted, requirements related to algorithms and key lengths that should be used for encryption, and/or the like. In addition, applicable law (e.g., privacy laws) may require that a workload be executed in a certain geographic location, such as in a particular country. One way to implement these security requirements is to rely upon individuals responsible for workload placement to select satisfactory platforms. A disadvantage of this approach may be that compliance with the security requirements is not assured.

Consider an example requirement that a particular platform-portable workload be executed in the United States. Human error and implementation complexity can make it easy for the example requirement to be contravened. For instance, a user associated with an issuer of the particular platform-portable workload may misunderstand or misapply the example requirement by selecting a platform that will use computing resources in other physical locations instead of, or in addition to, computing resources located in the United States. By way of further example, although a particular platform might technically be able to satisfy the example requirement as a result of having computing resources physically located in the United States, systemic enforcement of the example requirement may not be feasible. After initial placement, the particular platform-portable workload may be moved within the particular platform (e.g., moved among data centers), for example, for performance or availability reasons. This could result in the particular platform-portable work load executing on computing resources not physically located in the United States. In general, the particular platform may not be aware of specific security features that resulted in its selection. Therefore, according to the above-described approach, the example requirement may not be visible or accessible to the particular platform after placement of the particular platform-portable workload.

The present disclosure describes examples of extending a definition of platform-portable workloads to go beyond, for example, performance-related requirements such as processor, memory, network-capacity and storage requirements to further include data security policies. In certain embodiments, a data security policy can specify data security features that any platform executing a given platform-portable workload should or must implement. In various embodiments, the data security policy can be expressed as digitally signed metadata that persists and travels with the platform-portable workload. Advantageously, in certain embodiments, a trusted workload ecosystem can result that includes computer systems configured to create or accept such a data security policy. For example, the trusted workload ecosystem can include one or more issuers of platform-portable workloads, one or more platforms, one or more workload-brokering computer systems, etc. Advantageously, in certain embodiments, execution of such a platform-portable workload in contravention of an applicable data security policy can be automatically prevented.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
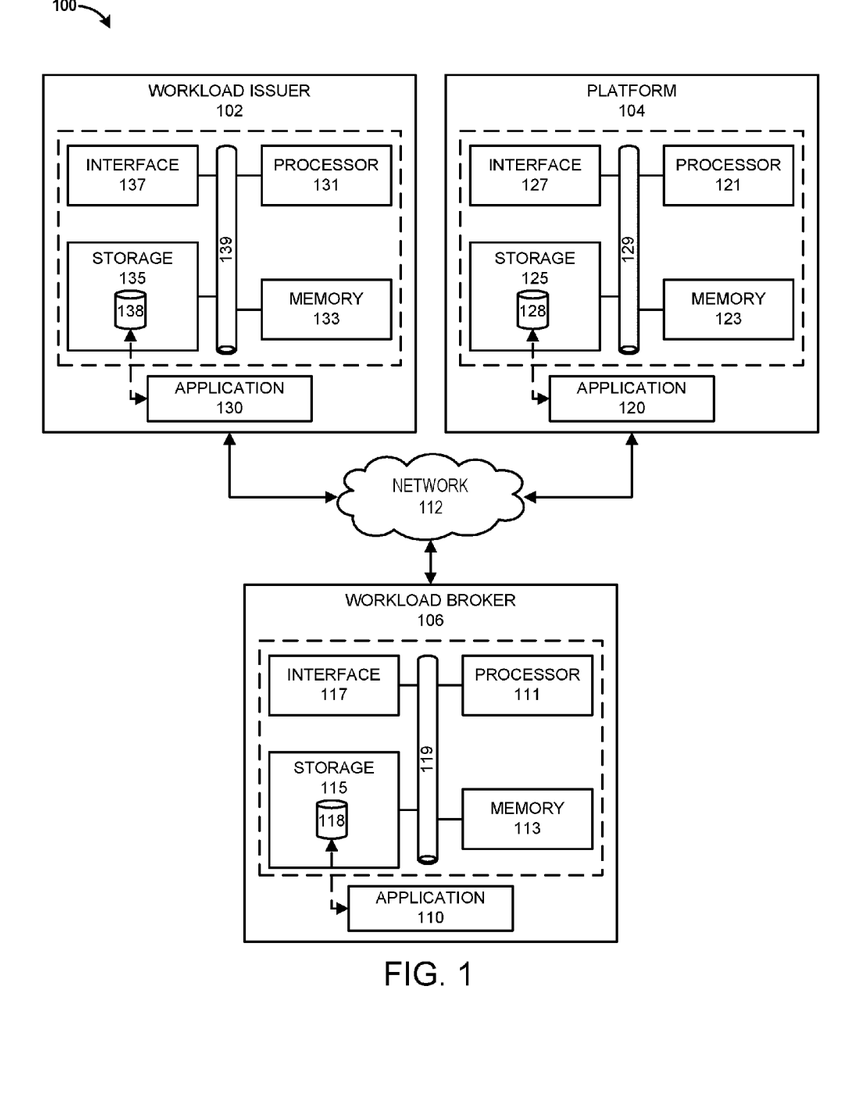
FIG. 1 illustrates an example of a system for workload execution.

FIG. 1 illustrates an example of a system 100 for workload execution. The system 100 includes a broker computer system 106, a platform 104, and an issuer computer system 102, each of which is operable to communicate over a network 112. Although shown singly for simplicity of illustration, it should be appreciated that the broker computer system 106, the platform 104, and the issuer computer system 102 can each be representative of more than one broker computer system, platform, and issuer computer system, respectively.

The broker computer system 106, the platform 104, and the issuer computer system 102 may each include one or more portions of one or more computer systems. In particular embodiments, one or more of these computer systems may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of broker computer system 106, platform 104, and issuer computer system 102 may comprise any suitable physical form, configuration, number, type and/or layout. As an example, and not by way of limitation, broker computer system 106, platform 104, and/or issuer computer system 102 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, broker computer system 106, platform 104, and/or issuer computer system 102 may include one or more computer systems; be unitary or distributed; span multiple locations; span multiple machines; or reside in a cloud, which may include one or more cloud components in one or more networks.

In the depicted embodiment, broker computer system 106, platform 104, and issuer computer system 102 each include their own respective processors 111, 121, and 131; memory 113, 123, and 133; storage 115, 125, and 135; interfaces 117, 127, and 137; and buses 119, 129, and 139. Although a particular computer system is depicted having a particular number of particular components in a particular arrangement, this disclosure contemplates any suitable computer system having any suitable number of any suitable components in any suitable arrangement. For simplicity, similar components of broker computer system 106, platform 104, and issuer computer system 102 will be discussed together while referring to the components of broker computer system 106. However, it is not necessary for these devices to have the same components, or the same type of components. For example, processor 111 may be a general purpose microprocessor and processor 121 may be an application specific integrated circuit (ASIC).

Processor 111 may be a microprocessor, controller, or any other suitable computing device, resource, or combination of hardware, software and/or encoded logic operable to provide, either alone or in conjunction with other components, (e.g., memory 113) wireless networking functionality. Such functionality may include providing various features discussed herein. In particular embodiments, processor 111 may include hardware for executing instructions, such as those making up a computer program. As an example and not by way of limitation, to execute instructions, processor 111 may retrieve (or fetch) instructions from an internal register, an internal cache, memory 113, or storage 115; decode and execute them; and then write one or more results to an internal register, an internal cache, memory 113, or storage 115.

In particular embodiments, processor 111 may include one or more internal caches for data, instructions, or addresses. This disclosure contemplates processor 111 including any suitable number of any suitable internal caches, where appropriate. As an example and not by way of limitation, processor 111 may include one or more instruction caches, one or more data caches, and one or more translation lookaside buffers (TLBs). Instructions in the instruction caches may be copies of instructions in memory 113 or storage 115 and the instruction caches may speed up retrieval of those instructions by processor 111. Data in the data caches may be copies of data in memory 113 or storage 115 for instructions executing at processor 111 to operate on; the results of previous instructions executed at processor 111 for access by subsequent instructions executing at processor 111, or for writing to memory 113, or storage 115; or other suitable data. The data caches may speed up read or write operations by processor 111. The TLBs may speed up virtual-address translations for processor 111. In particular embodiments, processor 111 may include one or more internal registers for data, instructions, or addresses. Depending on the embodiment, processor 111 may include any suitable number of any suitable internal registers, where appropriate. Where appropriate, processor 111 may include one or more arithmetic logic units (ALUs); be a multi-core processor; include one or more processors 111; or be any other suitable processor.

Memory 113 may be any form of volatile or non-volatile memory including, without limitation, magnetic media, optical media, random access memory (RAM), read-only memory (ROM), flash memory, removable media, or any other suitable local or remote memory component or components. In particular embodiments, memory 113 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 113 may include one or more memories 113, where appropriate. Memory 113 may store any suitable data or information utilized by broker computer system 106, including software embedded in a computer readable medium, and/or encoded logic incorporated in hardware or otherwise stored (e.g., firmware). In particular embodiments, memory 113 may include main memory for storing instructions for processor 111 to execute or data for processor 111 to operate on. In particular embodiments, one or more memory management units (MMUs) may reside between processor 111 and memory 113 and facilitate accesses to memory 113 requested by processor 111.

As an example and not by way of limitation, broker computer system 106 may load instructions from storage 115 or another source (such as, for example, another computer system) to memory 113. Processor 111 may then load the instructions from memory 113 to an internal register or internal cache. To execute the instructions, processor 111 may retrieve the instructions from the internal register or internal cache and decode them. During or after execution of the instructions, processor 111 may write one or more results (which may be intermediate or final results) to the internal register or internal cache. Processor 111 may then write one or more of those results to memory 113. In particular embodiments, processor 111 may execute only instructions in one or more internal registers or internal caches or in memory 113 (as opposed to storage 115 or elsewhere) and may operate only on data in one or more internal registers or internal caches or in memory 113 (as opposed to storage 115 or elsewhere).

In particular embodiments, storage 115 may include mass storage for data or instructions. As an example and not by way of limitation, storage 115 may include a hard disk drive (HDD), a floppy disk drive, flash memory, an optical disc, a magneto-optical disc, magnetic tape, or a Universal Serial Bus (USB) drive or a combination of two or more of these. Storage 115 may include removable or non-removable (or fixed) media, where appropriate. Storage 115 may be internal or external to broker computer system 106, where appropriate. In particular embodiments, storage 115 may be non-volatile, solid-state memory. In particular embodiments, storage 115 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 115 may take any suitable physical form and may comprise any suitable number or type of storage. Storage 115 may include one or more storage control units facilitating communication between processor 111 and storage 115, where appropriate.

In particular embodiments, interface 117 may include hardware, encoded software, or both providing one or more interfaces for communication (such as, for example, packet-based communication) among broker computer system 106, platform 104, issuer computer system 102, any networks, any network devices, and/or any other computer systems. As an example and not by way of limitation, communication interface 117 may include a network interface controller (NIC) or network adapter for communicating with an Ethernet or other wire-based network and/or a wireless NIC (WNIC) or wireless adapter for communicating with a wireless network.

Depending on the embodiment, interface 117 may be any type of interface suitable for any type of network for which broker computer system 106 is used. As an example and not by way of limitation, broker computer system 106 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, broker computer system 106 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. Broker computer system 106 may include any suitable interface 117 for any one or more of these networks, where appropriate.

In some embodiments, interface 117 may include one or more interfaces for one or more I/O devices. One or more of these I/O devices may enable communication between a person and broker computer system 106. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 117 for them. Where appropriate, interface 117 may include one or more drivers enabling processor 111 to drive one or more of these I/O devices. Interface 117 may include one or more interfaces 117, where appropriate.

Bus 119 may include any combination of hardware, software embedded in a computer readable medium, and/or encoded logic incorporated in hardware or otherwise stored (e.g., firmware) to couple components of broker computer system 106 to each other. As an example and not by way of limitation, bus 119 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 119 may include any number, type, and/or configuration of buses 119, where appropriate. In particular embodiments, one or more buses 119 (which may each include an address bus and a data bus) may couple processor 111 to memory 113. Bus 119 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 111 (such as, for example, one or more internal registers or caches), one or more portions of memory 113, one or more portions of storage 115, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

In certain embodiments, the issuer computer system 102, the platform 104, and the broker computer system 106 implement a trusted workload ecosystem as described above. In certain embodiments, the issuer computer system 102 can allow a security policy to be expressed as metadata that is digitally signed. In various embodiments, the security policy can be created from input received from an administrator, user, or network element in communication with the issuer computer system 102. The issuer computer system 102 may facilitate selection and/or creation of a platform-portable workload by a user. In general, the platform-portable workload can include a digitally signed data security policy selectable or specifiable by the user. An example of the platform-portable workload will be described in greater detail with respect to FIG. 2.

In some embodiments, the broker computer system 106 can receive the platform-portable workload from the issuer computer system 102. Thereafter, the broker computer system 106 can interface with a plurality of platforms to select the platform 104 and place the platform-portable workload on the platform 104. In certain embodiments, execution of the platform-portable workload in contravention of the data security policy can be automatically prevented. In various cases, the automatic prevention can occur on the issuer computer system 102, the platform 104, and/or the broker computer system 106. Example operation of the system 100 will be described in greater detail with respect to FIG. 3.

Operation of the issuer computer system 102, the platform 104, and the broker computer system 106 can be facilitated by an application 130, an application 120, and an application 110, respectively. In many cases, one or more of the application 130, the application 120, and the application 110 may operate as a distributed software application. In addition, in some embodiments, the application 130, the application 120, and the application 110 may be representative of a plurality of software applications. The applications 130, 120, and 110 may access data stores 138, 128, and 118, respectively, on storage 135, 125, and 115, respectively.

The data stores 138, 128, and 118 can include, for example, one or more databases, one or more flat files, and/or the like. In an example, the data store 138 on the issuer computer system may store data security features that may be selectable by a user for a data security policy. In another example, the data store 138 on the issuer computer system may store preconfigured data security policies for user selection or system selection based on user-provided criteria. In yet another example, the data store 128 may store data security attributes of the platform 104. In some embodiments, the data store 118 of the broker computer system 106 may store, or cache, data security attributes for the platform 104 and/or a plurality of other platforms, as well as other data.

In certain embodiments, the issuer computer system 102, the platform 104, and the broker computer system 106 implement and conform to a standard for how data security policies should be specified (e.g., an XML schema). In these embodiments, the data security features and the preconfigured data security policies that may be stored in the data store 138 of the issuer computer system 102 will generally conform to that standard. In similar fashion, in these embodiments, the data security attributes stored in the data store 128 of the platform 104 will generally provide information related to data security features that may be specifiable according to the standard. This information can include, for example, for each data security feature, an indication of an extent to which the data security feature is supported by the platform 104. In some embodiments, this information can further include an indication of whether each data security feature is mandatory (e.g., required to execute) or optional (e.g., a desired feature whose absence, by itself, might not prevent execution). In these embodiments, an optional data security feature might be used as platform-selection criteria or as a basis for instituting a negotiation process should the optional data security feature not be satisfied by a given platform.

It should be appreciated that the system 100 is only intended to illustrate an example implementation. Although particular systems are shown for illustrative purposes, in some embodiments, such systems can be combined or have their functionality distributed or allocated differently. For example, in some embodiments, a single system may embody the functionality of the issuer computer system 102 and the broker computer system 106. Other variations be apparent to one skilled in the art after reviewing the present disclosure.

Figure 2:
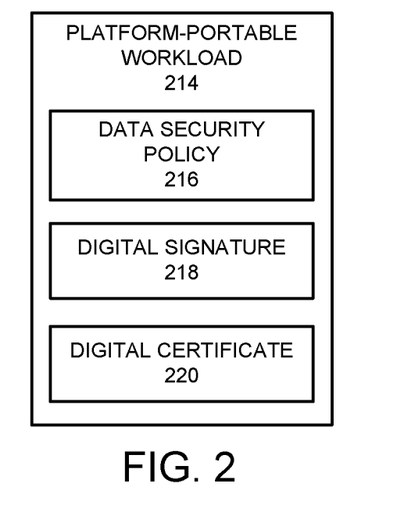
FIG. 2 illustrates an example of a platform-portable workload.

FIG. 2 illustrates an example of a platform-portable workload 214. The platform-portable workload 214 includes a data security policy 216 that is digitally signed by a digital signature 218. In various embodiments, the data security policy 216 can be expressed as metadata using, for example, an XML schema. In a typical embodiment, the digital signature 218 is a signature of an issuer of the platform-portable workload 214. The issuer may be similar, for example, to the issuer computer system 102 of FIG. 1.

The platform-portable workload 214 can further include a digital certificate 220. In general, the digital certificate 220 can be a public key associated with the issuer that is verifiable via a trusted certificate authority. In many cases, the digital certificate 220 may be from, or issued by, the trusted certificate authority. The trusted certificate authority can be any agreed-upon security source such as, for example, a commercial certificate authority (e.g., Verisign), a private certificate authority for a particular company or community, and/or the like. In a typical embodiment, the digital certificate 220 is digitally signed by the trusted certificate authority so as to attest to its authenticity.

In certain embodiments, the digital signature 218 and the digital certificate 220 can be used in combination to validate that the security policy 216 originated from the issuer. In an example, the validation can include verifying that the digital certificate 220 is from, or issued by, the trusted certificate authority. When the digital certificate 220 is digitally signed by the trusted certificate authority as described above, the digital certificate 220 can be verified using the trusted certificate authority's public key, which key may be published or shared by the trusted certificate authority. Thereafter, or separately, the validation can include using the digital certificate 220 (which can be, e.g., the public key of the issuer) to verify that the digital signature 218 is the signature of the issuer.

The data security policy 216 can specify data security features that can include local attributes such as the type and strength of algorithms and keys for encryption and authentication credentials. The data security features specified by the data security policy 216 can also extend to the environment by specifying, for example, a geographic location, physical requirements such as the type of access control on a particular platform's facility, and that no wireless access be allowed. By way of further example, the data security policy 216 can specify the type of operating system required, such as a common criteria certified version of LINUX. By way of additional example, the data security policy 216 can specify data security features related to disaster recovery, adequate fire protection, US citizens working in the data center, Federal Information Processing Standards (FIPS) certified equipment, whether there is a locking rack, whether there is a hardware security module (HSM) available for storing sensitive data such as encryption keys and credentials in hardware, and required certifications such as United States Government Internet Protocol version 6 (USG IPV6), Statement on Auditing Standards No. 70 (SAS70), or Payment Card Industry (PCI).

Table 1 below is an example of a metadata model that can be used for data security policies such as the data security policy 216. In particular, Table 1 illustrates examples of data security features that can be specified in data security policies. Numerous other examples will be apparent to one skilled in the art after reviewing the present disclosure.

TABLE 1

EXAMPLE METADATA MODEL

| | | |
|---|---|---|
| 1. Physical Security | a. Door requirements | |
| | b. Fire requirements | |
| | c. Air conditioning | |
| | d. Backup power | |
| | e. Distance from original workload location | |
| | f. Size of city | |
| | g. Backup/Disaster Recovery(DR) available | i. Hot/warm/cold site |
| 2. Workload encryption | a. Inflight | i. Authentication algorithm choices |
| | | ii. Encryption algorithm choices and key sizes |
| | | iii. Stream or block cipher |
| | | iv. Encryption modes (Electronic Codebook (ECB), Cipher Block Chaining (CBC), etc.) |
| | b. At rest | i. Authentication algorithm choices |
| | | ii. Encryption algorithm choices and key sizes |
| | | iii. Block or object encryption |
| 3. Authentication requirements | a. Username/password | i. Password minimum length, password maximum length |
| | b. Two factor-types, minimum length | ii. Alpha, numbers, symbols |
| | c. Common Access Card Personal Identity Verification (CAC PIV) | |
| | d. Smart Card | |
| | e. OpenID Connect (Facebook (FB), etc.) | |
| | f. Other | |
| 4. Virtualization Options | a. Bare Metal | |
| | b. Hypervisor | i. Allowed Hypervisors |
| | | ii. Disallowed Hypervisors |
| 5. Network Security | a. Separate firewall | |
| | b. Level 3, 4, Deep packet Inspection | |
| | c. Allowed protocols | |
| | d. Disallowed protocols | |
| | e. Separate Virtual Local Area Network (VLAN) | |
| | f. Separate network segment | |
| 6. Security services | a. Forensics | |
| | b. Memory Encryption | |
| | c. HSM support | |
| | d. Session Recording | |
| | e. Memory Snapshots | |
| 7. Audit/logging | a. Admin level logging | |
| | b. User level logging | |
| | c. Logs of configuration Changes | |
| | d. Security Event logging | |
| 8. Geolocation Requirements | a. Must stay in same state | |
| | b. Must stay in same country | |
| | c. Must stay in group of countries | i. Bureau of Industry and Security (BIS) commerce groups (Group A, B, C, D, E) |
| | | ii. International Traffic in Arms Regulations (ITAR) |
| | | iii. EU |
| | | iv. NATO |
| | | v. Asia |
| | | vi. Specific country groupings |
| | | vii. Specific country IDs |
| 9. Operating system and patch levels | a. WINDOWS versions | |
| | b. LINUX versions | |
| | c. APACHE | |
| | d. Open SSL level | |
| | e. JAVA patch level | |
| | f. ADOBE patch level | |
| | g. Common criteria version of WINDOWS | |
| | h. Common criteria version of LINUX | |
| | i. FIPS level | i. 140-2 level 2 |
| | | ii. 140-2 level 3 |
| 10. Security standards required | a. PCI, version number | |
| | b. Health Insurance Portability and Accountability Act (HIPAA) | |
| | c. FedRamp H/M/L | |
| 11. Vendor clouds | a. Allowed cloud sites | i. Cloud domain name |

TABLE 1-continued

EXAMPLE METADATA MODEL

| | b. Disallowed cloud sites | i. Cloud domain name |
|---|---|---|
| 12. Security standards | a. PCI | |
| | b. HIPAA | |
| | c. FedRamp | i. Low |
| | | ii. Medium |
| | | iii. High |
| | d. North American Electric Reliability Corporation (NERC) | |
| | e. Federal Financial Institutions Examination Council (FFIEC) | |
| | f. National Institute of Standards and Technology (NIST) | i. 800-53 |
| | | ii. 800-147 |

Figure 3:
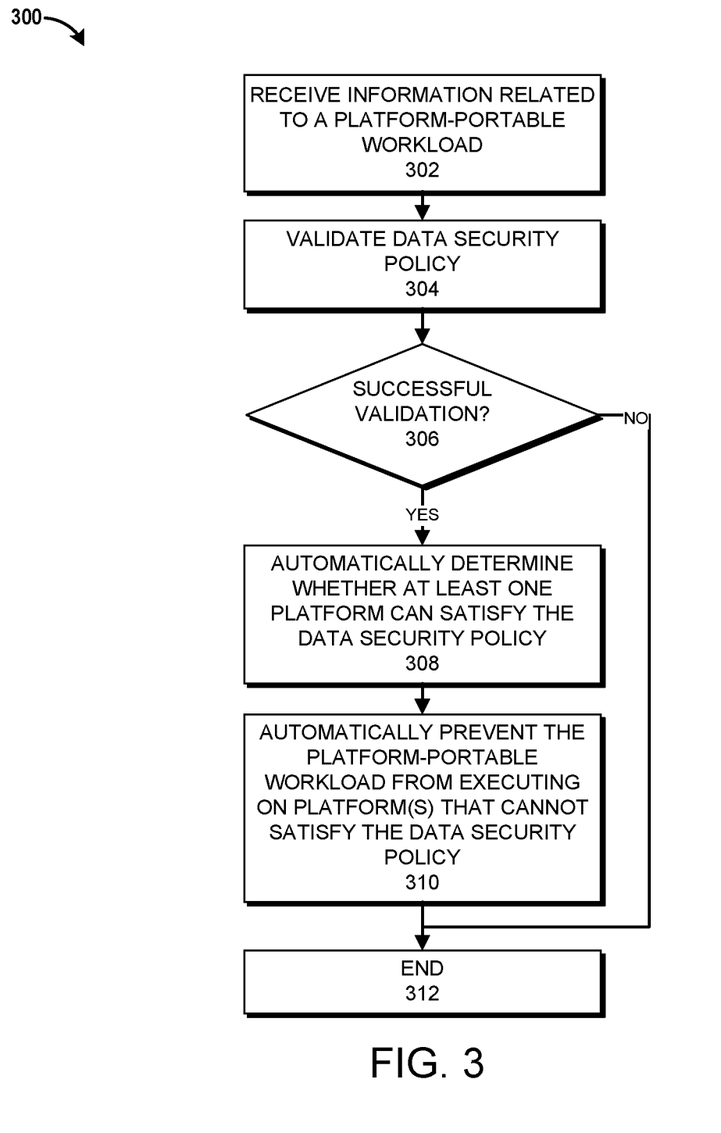
FIG. 3 illustrates an example of a process for executing a platform-portable workload.

FIG. 3 illustrates an example of a process 300 for executing a workload. For example, the process 300, in whole or in part, can be implemented by the issuer computer system 102, the platform 104, and/or the broker computer system 106. The process 300 can also be performed generally by the system 100. Although any number of systems, in whole or in part, can implement the process 300, to simplify discussion, the process 300 will be described in relation to a computer system. In various cases, the computer system can be, for example, the platform 104, the broker computer system 106, etc.

At block 302, the computer system receives information related to a platform-portable workload such as, for example, the platform-portable workload 214. In that way, the platform-portable workload can include a security policy that is digitally signed by an asserted signature of an issuer of the platform-portable workload. The platform-portable workload can further include a digital certificate. In general, the security policy, the asserted signature, and the digital certificate can include the features described with respect to the security policy 216, the digital signature 218, and the digital certificate, respectively, of FIG. 2. In certain embodiments, the information received by the computer system is the platform-portable workload.

At block 304, the computer system validates the security policy as originating from the issuer. The validating can include verifying that the digital certificate is from, or issued by, a trusted certificate authority and verifying that the asserted signature is valid using the digital certificate. In general, the validating can be performed as described with respect to FIG. 2. At decision block 306, the computer system determines whether the validation at block 304 was successful. If not, the process 300 proceeds to block 312 without the platform-portable workload being executed. Otherwise, if the computer system determines that the validation was successful, the process 300 proceeds to block 308.

At block 308, the computer system automatically determines whether at least one platform (e.g., the platform 104 of FIG. 1) can satisfy the data security policy. In various embodiments, the block 308 can include comparing the data security policy with data security attributes of one or more platforms. In typical embodiment, a given platform may be considered to satisfy the data security policy if the data security attributes of the given platform indicate that all data security features specified by the data security policy can be met.

At block 310, the computer system automatically prevents the platform-portable workload from executing on platform(s) that cannot satisfy the data security policy. In cases where the computer system is associated with a platform such as the platform 104 of FIG. 1, the block 310 can include the platform rejecting the platform-portable workload. In cases where the computer system is, or is associated with, a broker computer system such as the broker computer system 106 of FIG. 1, the block 310 can include the broker computer system preventing the platform-portable workload from being sent to the platform(s) that cannot satisfy the data security policy. In addition, in these cases, the broker computer system may select another platform, from among potentially a plurality of platforms, that is determined to satisfy the data security policy and transmit the platform-portable workload to that platform for execution. Additionally, as described above, the data security policy may in some cases designate one or more data security features as optional. In these cases, the block 310 may further include the broker computer system managing a negotiation process, for example, between the issuer and one or more platforms that fail to satisfy the optional data security features. In certain embodiments, the fact that any optional data security features are not satisfied can result in an alert being sent to one or more designated entities or users (e.g., entities or users associated with the issuer). At block 312, the process 300 ends.

In various embodiments, a process similar to the process 300 can be executed each time a given platform-portable workload is to be executed. Advantageously, in certain embodiments, because the data security policy persists and travels with the given platform-portable workload, a platform can execute all or part of the process 300 so as to prevent a data security policy from being contravened even after workload placement. In similar fashion, a broker computer system can execute all or part of the process 300 at any point so as to prevent the given platform-portable workload from being transferred to a non-compliant platform, even long after initial receipt of the platform-portable workload from an issuer computer system.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising, by an information handling system comprising a processor and memory:

receiving information related to a platform-portable workload, the information comprising a data security policy expressed as digitally signed metadata, wherein the data security policy specifies one or more data security features that any platform allowed to execute the platform-portable workload is to implement;
validating the digitally signed metadata as originating from an issuer computer system that issued the platform-portable workload;
responsive to the validating, automatically determining that a particular platform cannot satisfy the data security policy based, at least in part, on a comparison of the digitally signed metadata with data security attributes of the particular platform; and
responsive to the automatically determining, automatically preventing execution of the platform-portable workload on the particular platform,
wherein the automatically preventing comprises:
selecting a second platform that is determined to satisfy the data security policy; and
transmitting the platform-portable workload to the second platform for execution.

2. The method of claim 1, wherein the information handling system is associated with the particular platform.

3. The method of claim 1, wherein the automatically preventing further comprises preventing the platform-portable workload from being sent to the particular platform for execution.

4. The method of claim 1, wherein the selecting comprises selecting the second platform from among a plurality of platforms.

5. The method of claim 1, wherein:
the information comprises an asserted signature of the issuer computer system and a digital certificate, the digital certificate comprising a public key; and
the validating comprises:
verifying that the digital certificate is from a trusted certificate authority; and
verifying that the asserted signature is valid using the public key.

6. The method of claim 1, wherein the information related to the platform-portable workload is the platform-portable workload.

7. The method of claim 1, wherein the digitally signed metadata conforms to a standard implemented by at least the issuer computer system and the information handling system.

8. The method of claim 1, wherein the one or more data security features are selected from the group consisting of: physical security features, encryption features, user authentication features, virtualization features, network security features, security services offered, audit features, geolocation requirements, operating system version, and security standards supported.

9. An information handling system comprising a hardware processor and physical memory, wherein the hardware processor and physical memory in combination are configured to implement a method comprising:
receiving information related to a platform-portable workload, the information comprising a data security policy expressed as digitally signed metadata, wherein the data security policy specifies one or more data security features that any platform allowed to execute the platform-portable workload is to implement;
validating the digitally signed metadata as originating from an issuer computer system that issued the platform-portable workload;
responsive to the validating, automatically determining that a particular platform cannot satisfy the data security policy based, at least in part, on a comparison of the digitally signed metadata with data security attributes of the particular platform; and
responsive to the automatically determining, automatically preventing execution of the platform-portable workload on the particular platform,
wherein the automatically preventing comprises:
selecting a second platform that is determined to satisfy the data security policy; and
transmitting the platform-portable workload to the second platform for execution.

10. The information handling system of claim 9, wherein the information handling system is associated with the particular platform.

11. The information handling system of claim 9, wherein the selecting comprises selecting the second platform from among a plurality of platforms.

12. The information handling system of claim 9, wherein:
the information comprises an asserted signature of the issuer computer system and a digital certificate, the digital certificate comprising a public key; and
the validating comprises:
verifying that the digital certificate is from a trusted certificate authority; and
verifying that the asserted signature is valid using the public key.

13. The information handling system of claim 9, wherein the information related to the platform-portable workload is the platform-portable workload.

14. The information handling system of claim 9, wherein the digitally signed metadata conforms to a standard implemented by at least the issuer computer system and the information handling system.

15. The information handling system of claim 9, wherein the one or more data security features are selected from the group consisting of: physical security features, encryption features, user authentication features, virtualization features, network security features, security services offered, audit features, geolocation requirements, operating system version, and security standards supported.

16. A computer-program product comprising a non-transitory computer-usable medium having computer-readable program code embodied therein, the computer-readable program code adapted to be executed to implement a method comprising:
receiving information related to a platform-portable workload, the information comprising a data security policy expressed as digitally signed metadata, wherein the data security policy specifies one or more data security features that any platform allowed to execute the platform-portable workload is to implement;
validating the digitally signed metadata as originating from an issuer computer system that issued the platform-portable workload;
responsive to the validating, automatically determining that a particular platform cannot satisfy the data security policy based, at least in part, on a comparison of the digitally signed metadata with data security attributes of the particular platform; and
responsive to the automatically determining, automatically preventing execution of the platform-portable workload on the particular platform,
wherein the automatically preventing comprises:
selecting a second platform that is determined to satisfy the data security policy; and transmitting the platform-portable workload to the second platform for execution.

\* \* \* \* \*